(12) United States Patent
Ogawa et al.

(10) Patent No.: US 6,349,126 B2
(45) Date of Patent: Feb. 19, 2002

(54) PEDOMETER CAPABLE OF KEEPING USER INTERESTED IN EXERCISE

(75) Inventors: Hiroshi Ogawa; Munehiro Kitamura; Masazumi Kihira; Koji Maehashi, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/832,905

(22) Filed: Apr. 12, 2001

(30) Foreign Application Priority Data

Apr. 14, 2000 (JP) .......................................... 12-113064

(51) Int. Cl.$^7$ .............................................. G16C 21/00
(52) U.S. Cl. ...................................................... 377/24.2
(58) Field of Search ........................................ 372/24.2

(56) References Cited

U.S. PATENT DOCUMENTS 5,526,290 A * 6/1996 Kankazi ..................... 364/565

FOREIGN PATENT DOCUMENTS

| JP | 63-135473 | 9/1988 |
|---|---|---|
| JP | 2-42156 | 3/1990 |

* cited by examiner

Primary Examiner—Margaret R. Wambach
(74) Attorney, Agent, or Firm—Morrison & Foerster LLP

(57) ABSTRACT

A pedometer determines that the user does not wear the pedometer when the current number of steps is not more than a prescribed set value, not to employ the data of the current number of steps on the day the user does not wear the pedometer for calculating an average number of steps. If the current number of steps is in excess of the set value, the pedometer determines that the user wears the pedometer for adding the current number of steps to the total number of steps, adding 1 to the number of days and dividing the total number of steps by the number of days for calculating an average number of steps per day. Consequently, a pedometer having a function of displaying the average number of steps per day, which can not only maintain correctness of the average number of steps but also keep the user interested in exercise even if the user forgets wearing the pedometer, can be provided.

9 Claims, 7 Drawing Sheets

PEDOMETER CAPABLE OF KEEPING USER INTERESTED IN EXERCISE

BACKGROUND OF THE INVENTION

1. Field of the Invention

The present invention relates to a pedometer which can keep the user interested in exercise, and more particularly, it relates to a pedometer displaying not only the current number of steps but also various information related to walking such as the total number of steps theretofore counted over a set period, the total number of days spent for counting the steps, the average number of steps per day and the like.

2. Description of the Prior Art

General pedometers include the following apparatuses:

① A pedometer simply numerically displaying the number of counted steps on a display part.

② A pedometer having a memory for about a week for storing the number of steps counted over a week in the memory every day and arbitrarily displaying the number of steps counted over the preceding week on the display part every day (e.g. Japanese Utility Model Laying-Open No. 2-42156 (1990) "Pedometer").

③ A pedometer displaying an average number of steps per day for expressing the number of steps counted over a long period (e.g. Japanese Utility Model Laying-Open No. 63-135473 (1988) "Pedometer").

In order to keep his/her health and develop his/her strength with such a pedometer, the user must continuously take walking exercise over a long period.

However, the aforementioned conventional pedometers have the following problems:

The pedometer ① has a simple function. Whether or not the user increases the number of steps as compared with the preceding day, therefore, the pedometer starts counting the steps anew on this day. Thus, the result of the user's effort is not reflected on the pedometer and hence the user cannot keep but soon loses his/her interest in walking. Consequently, the user tends to neglect daily exercise itself.

Although the pedometer ② has a more complicated function than the pedometer ①, data of the preceding week disappear sequentially from the oldest one. Therefore, the pedometer is so limited in capability of keeping the user interested in exercise that the user finally loses his/her interest in exercise. While the memory of the pedometer may be increased in capacity for increasing the number of days storable in the memory beyond a week or to be capable of displaying a graph of data over a month or a year, the structure of the memory or a control circuit of the pedometer is disadvantageously complicated in this case.

The pedometer ③ capable of expressing data related to walking over a long period can keep the user interested in exercise. The user can compare his/her average number of steps with those of his/her family or friends and hence his/her motivation for exercise is strengthened. Further, the used capacity of the memory is small and hence the pedometer can be provided at a relatively low cost.

If the user forgets wearing the pedometer in the morning, however, the pedometer counts zero or a value close to zero (if the pedometer erroneously operates due to some impact) as the current number of steps. The pedometer still records the date in this case, and hence average data is disturbed when the pedometer adds the current data thereto. Therefore, the result of the user's effort over tens of days is damaged by occasional carelessness, and the user thereafter hesitates to wear the pedometer and his/her motivation for daily exercise is weakened.

SUMMARY OF THE INVENTION

Accordingly, an object of the present invention is to provide a pedometer having a function of displaying an average number of steps per time, which can not only maintain correctness of the average number of steps but also keep the user interested in exercise even if the user forgets wearing the pedometer.

In order to attain the aforementioned object, the pedometer according to the present invention comprises a walking detection sensor detecting walking, a counter counting outputs from the walking detection sensor, a clock measuring time, a memory storing the total of each of the number of steps theretofore counted by the counter and the number days spent for counting the steps, a wear determination part determining whether or not the user wears the pedometer, and a display part displaying information related to the walking. The pedometer calculates an average number of steps per day from the total number of steps and the total number of days stored in the memory and displays the average number of steps on the display part, while the current number of steps and the number of days are added to the total number of steps and the total number of days stored in the memory on a day the wear determination part determines that the user wears the pedometer and the former are not added to the latter on a day the wear determination part determines that the user does not wear the pedometer.

When the wear determination part determines that the user does not wear the pedometer, the current number of steps and the number of days are not added to the total number of steps and the total number days stored in the memory respectively. In other words, the current data is excluded from calculation of the average number of steps, and hence the average number of steps can be correctly calculated even if the user forgets wearing the pedometer. Consequently, the pedometer correctly reflects a result of exercise, so that the user can keep his/her interest in the exercise.

Specifically, the wear determination part of this pedometer automatically or manually determines whether or not the user wears the pedometer. The wear determination part automatically makes this determination from the current number of steps. More specifically, the wear determination part compares the current total number of steps with a set value and determines that the user does not wear the pedometer when the total number of steps is not more than the set value. In this case, the set value is preferably changeable through a key. This is because the daily behavioral pattern remarkably varies with the lifestyle of the user. The set value is relatively increased for an office worker or the like, particularly a sales staff generally working outside the office, for example. On the contrary, the set value is relatively reduced for a full-time housewife or the like generally staying indoors. This is because this type of user does not frequently walk about in general and hence the wear determination part may erroneously determine that the user does not wear the pedometer if the set value is excessive.

A switch may be utilized for automatically determining whether or not the user wears the pedometer. In this case, the switch is automatically turned on or off in response to whether or not the user wears the pedometer. When the user wears the pedometer, the switch is turned on so that the wear determination part automatically determines that the user wears the pedometer while determining that the user does not wear the pedometer if the switch is off.

On the other hand, the wear determination part manually determines whether or not the user wears the pedometer through key operation, for example.

Whether the wear determination part automatically or manually makes the aforementioned determination, the current number of steps and the number of days are not directly added to the total number of steps and the total number of days stored in the memory when the wear determination part determines that the user does not wear the pedometer. When the user does not wear the pedometer, the current number of steps or a preceding average number of steps and the number of days may be rendered manually addable to the total number of steps and the total number of days stored in the memory respectively. In this case, a rough number of steps can be estimated from the user's daily life pattern even if the user forgets wearing the pedometer, and hence a roughly estimated number of steps may be entered by key operation for the day the user forgets wearing the pedometer. If the number of steps cannot be estimated, the preceding average number of steps may be entered.

Alternatively, the preceding average number of steps and the number of days may be automatically added to the total number of steps and the total number of days stored in the memory respectively on the day the wear determination part determines that the user does not wear the pedometer. As to the day the wear determination part determines that the user does not wear the pedometer, the pedometer may be provided with a function for manually adding the current number of steps or the preceding average number of steps and the number of days to the total number of steps and the total number of days stored in the memory respectively so that the user manually enters the data through this function.

Also when the wear determination part determines that the user does not wear the pedometer, the total number of steps and the total number of days can be continuously calculated by manually or automatically setting the current number of steps or the preceding average number of steps.

In the pedometer according to the present invention, the memory may store the number of steps counted over a plurality of days every day and the display part may switchingly display the number of steps counted over the plurality of days stored in the memory every day, so that the function of the wear determination part for determining whether or not the user wears the pedometer is not used as to storage of the number of steps counted over the plurality of days in the memory. In this case, the current number of steps (zero or a value close to zero) is stored in the memory as such also when the wear determination part determines that the user does not wear the pedometer (the number of steps is not more than the set value or the key or the switch is operated).

In the present invention, the information related to walking includes the current number of steps, the total number of steps, the total number of days, the average number of steps, the number of steps per day over a plurality of days, the total number of steps counted over the plurality of days, the time and the like.

In the present invention, the wording "the user wears the pedometer" includes such a mode that the user carries the pedometer in his/her wear such as a pocket of his/her clothing or his/her bag or the like in addition to such a mode that the pedometer is fixed to slacks or a belt with a clip provided thereon so that the pedometer can count the user's steps, as described with reference to an embodiment of the present invention later.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 1:
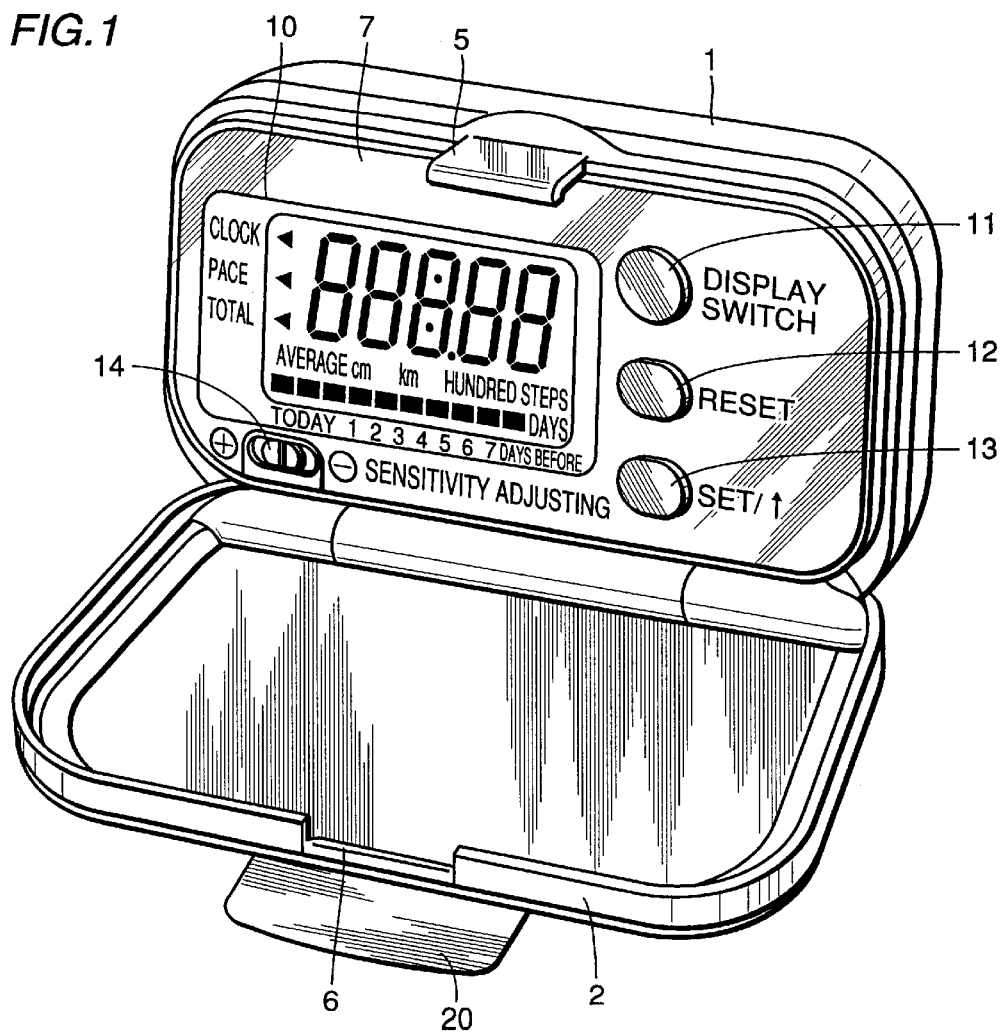
FIG. 1 is a perspective view of a pedometer according to an embodiment of the present invention with a rear case opened.
Figure 2:
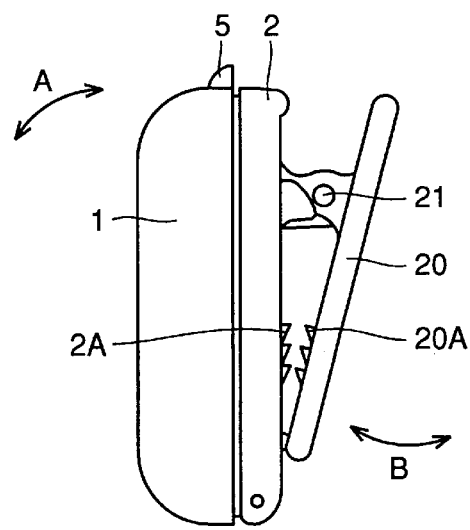
FIG. 2 is a side elevational view of the pedometer with the rear case closed.

Referring to FIGS. 1 and 2, a pedometer according to this embodiment comprises a front case 1 and a rear case 2. When the pedometer is attached to slacks or the like, the front case 1 is hinged to the rear case 2 to be openable/closable along arrow A in FIG. 2. A pawl 5 of the front case 1 is engaged in a notch 6 of the rear case 2, so that the front case 1 and the rear case 2 can be fixed in a closed state.

A panel 7 is engaged in the front case 1, while a display part 10, a display switch button 11, a reset button 12, a set/↑ button 13 and a step sensitivity adjusting knob 14 are provided on the panel 7.

A clip 20 is mounted on the rear case 2 to be swingable along arrow B in FIG. 2. This clip 20 is supported by a spindle 21 and urged to be closed by a spring (not shown) mounted on the spindle 21. The rear case 2 and the clip 20 are provided with projections 2A and 20A respectively, so that the user can reliably wear the pedometer with no displacement when the upper edge of the slacks, for example, is held by the clip 20.

Figure 3:
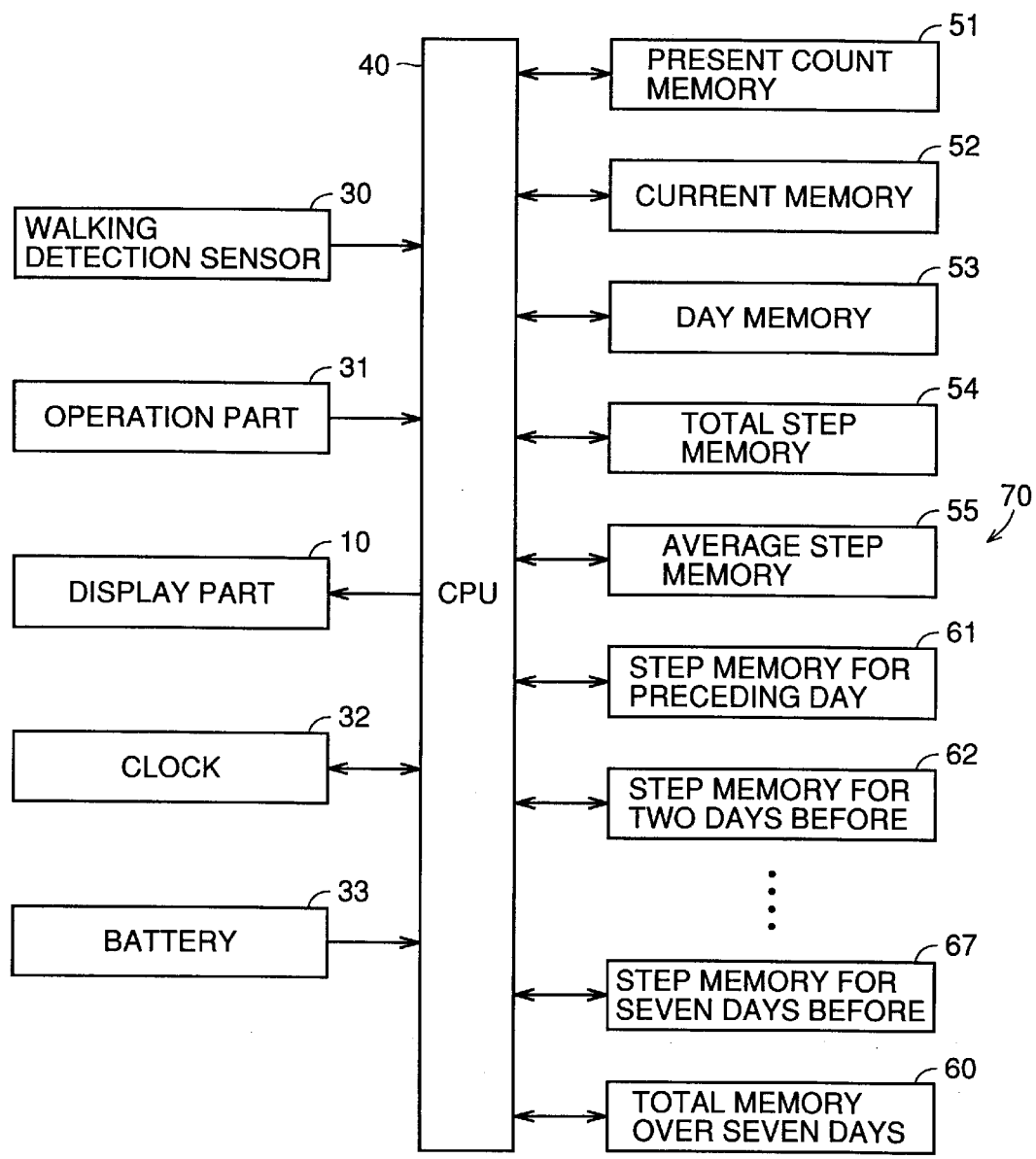
FIG. 3 is a block diagram schematically showing the structure of the pedometer.

FIG. 3 is a block diagram schematically showing the structure of this pedometer. This pedometer comprises a walking detection sensor 30 detecting walking, a control part (CPU) 40 of a microcomputer, an operation part 31 formed by the aforementioned buttons 11 to 13 and the like, the aforementioned display part 10, a clock 32 measuring time, a battery 33 supplying power to the respective parts, and a memory 70 storing various types of data.

An arbitrary form can be selected for the walking detection sensor 30 from a number of forms such as that having a switching function on the forward end of a pendulum for detecting body movement, for example. The sensitivity of the walking detection sensor 30 can be properly adjusted with the aforementioned step sensitivity adjusting knob 14 so that the difference between the number of steps counted by the user during walking and the displayed value is minimized.

The CPU 40 stores the clock 32, a present count memory 51, a current memory 52, a day memory 53, a total step memory 54, an average step memory 55, a total memory 60 over seven days, a step memory 61 for the preceding day, a step memory 62 for two days before, . . . , a step memory 67 for seven days before and the like. Further, the CPU 40 has a wear determination function for determining whether or not the user wears the pedometer and a function of not adding the current number of steps and the number of days to the total step memory 54 and the day memory 53 of the memory 70 respectively when determining that the user does not wear the pedometer through the wear determination function.

Figure 4:
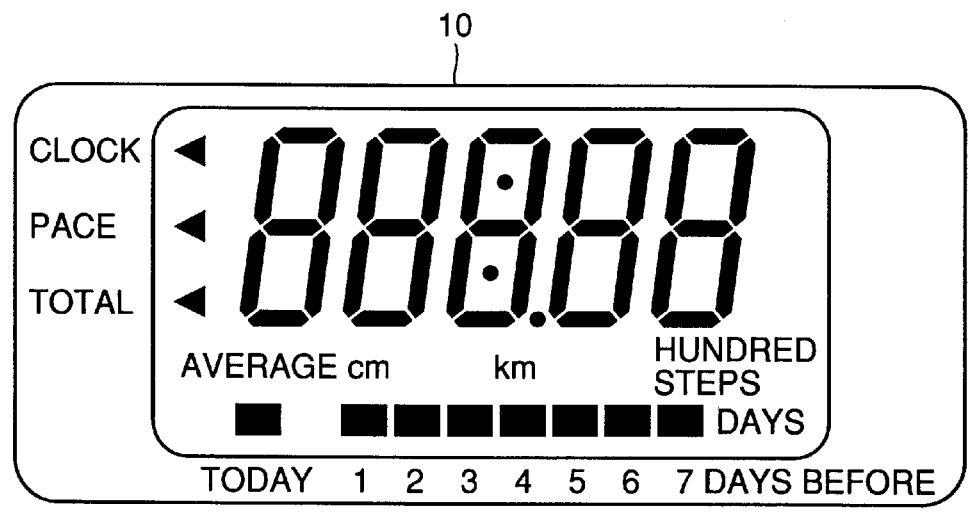
FIG. 4 is an enlarged plan view showing a display mode (total display state) of a display part of the pedometer.

As shown in an enlarged plan view (total display state) in FIG. 4, the display part 10 can display the total number of steps, the total number of days, the average number of steps, the current number of steps, the clock, the pace, the distance and the like. While the total number of steps, the total number of days, the average number of steps and the like may be simultaneously displayed, the following description is made with reference to a system varying the display contents with operation of the operation part 31.

The pedometer having a storage function may be provided with a backup function for protecting the contents stored in the memory 70 when the battery 33 is exchanged. The backup function may be implemented by employing a capacitor having a relatively large capacity as a power source or employing a battery dedicated to backup.

Figure 5:
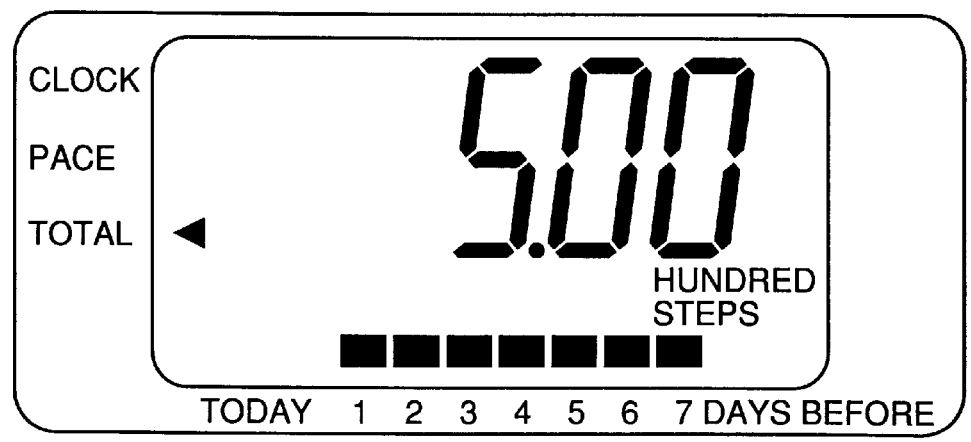
FIG. 5 is a plan view showing an exemplary display of a total number of steps counted over seven days in the display part of the pedometer.

The display mode of the display part 10 is briefly described. When the display part 10 displays the current number of steps through the display switching button 11, the display is switched to the number of steps counted on the preceding day, the number of steps counted two days before, . . . , the number of steps counted seven days before and the total number of steps counted over a week every time the set/↑ switch 13 is pressed. Referring to FIG. 5, the display part 10 displays the total number of steps counted over a week.

Figure 6A:
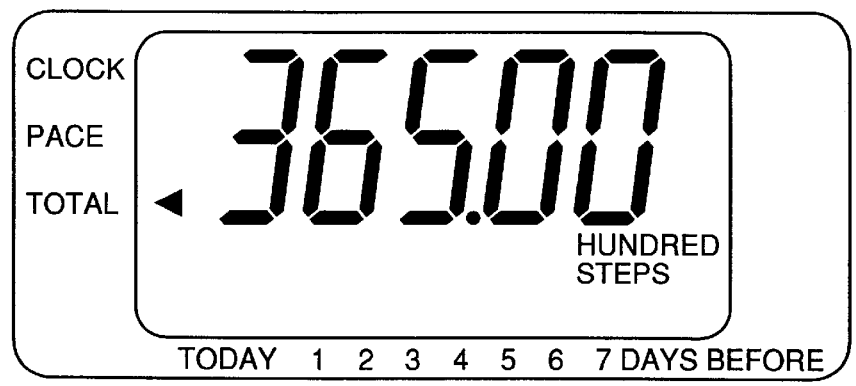
FIG. 6A is a plan view showing an exemplary display of a total number of steps in the display part of the pedometer.
Figure 6B:
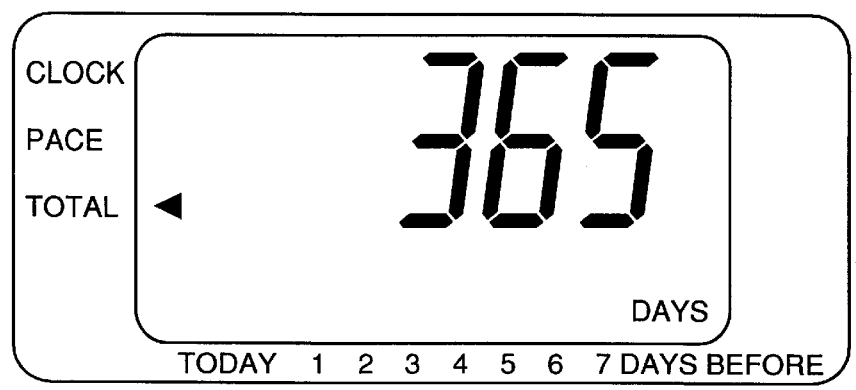
FIG. 6B is a plan view showing an exemplary display of a total number of days and FIG. 6C is a plan view showing an exemplary display of an average number of steps.
Figure 6C:
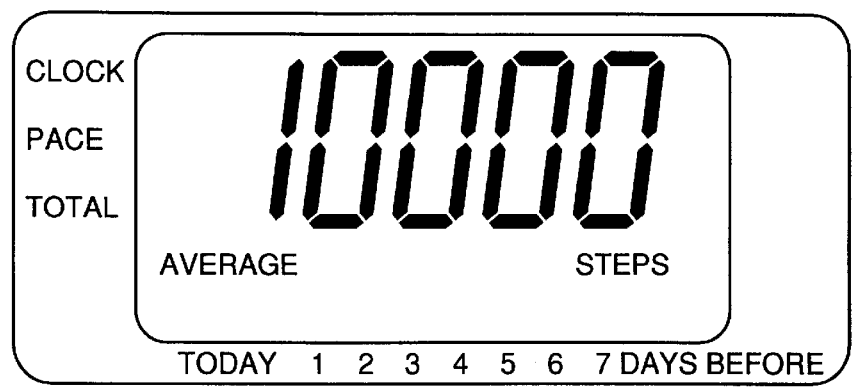

When the display part 10 displays totals through the display switching button 11, the display is switched to the total number of steps, the total number of days and the average number of steps per day every time the set/↑ button 13 is pressed, as shown in FIGS. 6A to 6C. The exemplary displays shown in FIGS. 6A to 6C are related to yearlong data.

The operation of the pedometer having the aforementioned structure is briefly described. The CPU 40 captures a walking signal detected by the walking detection sensor 30, increments the number of steps on the present count memory 51 by 1 and displays the resulting number of steps on the display part 10 as the current number of steps while adding 1 to the contents of the current memory 52.

The CPU 40 monitors the clock 32 and updates the total number of steps, the total number of days, the average number of steps and the like regularly at 24:00, for example, every day. The CPU 40 adds the contents of the current memory 52 to the contents of the total step memory 54 while erasing the contents of the current memory 52, for example. The CPU 40 further adds one day to the contents of the day memory 53, obtains the average number of steps by dividing the total number of steps stored in the total step memory 54 by the number of days stored in the day memory 53 and stores the obtained average number of steps in the average step memory 55.

When such processing is simply performed, zero or a value close to zero is added to the data of the total step memory 54 if the user forgets wearing the pedometer, leading to incorrect calculation of the average number of steps. However, the pedometer according to this embodiment has the wear determination function for determining whether or not the user wears the pedometer and the function of not adding the current number of steps and the number of days to the data of the total step memory 54 and the day memory 53 of the memory 70 respectively on a day the pedometer determines that the user does not wear the pedometer through this wear determination function, thereby causing no such problem.

More specifically, the CPU 40 determines whether or not the value stored in the current memory 52 exceeds a previously set numerical value. If the former is not in excess of the latter, the CPU 40 determines that the user does not wear the pedometer, and does not calculate the current total number of steps, the total number of days and the average number of steps.

As to the number of steps counted over seven days, however, the CPU 40 shifts the contents of the step memory 61 for the preceding day, the step memory 62 for two days before, . . . the step memory 67 for seven days before and performs addition as to the total memory 60 over seven days. This is because the number of steps counted over seven days is obtained from the data for the past seven days with reference to the current date and hence the dates of the data are confused if the number of steps on the day the user does not wear the pedometer is not input on this day. If the user does not wear the pedometer on one day, for example, storage of the number of steps counted over the week including this day runs over into the first day of the next week.

The memory 70 has the present count memory 51 and the current memory 52 since reset operation is manually performed. In this pedometer, the current number of steps can be arbitrarily reset through the reset button 12 of the operation part 31 in order to count steps between points A and B, for example. In this case, the data of the current number of steps disappears if the memory 70 has no current memory 52. If the current number of steps is reset not arbitrarily but at 24:00 as described above, the memory 70 may have only either the present count memory 51 or the current memory 52, as a matter of course.

The total operation of the pedometer is now described with reference to flow charts shown in FIGS. 7 to 9. In the flow chart shown in FIG. 7, the operation starts when power is supplied to the pedometer. At a step (hereinafter abbreviated as ST) 1, the CPU 40 clears each memory of the memory 70. In other words, the CPU 40 clears the memories 51 to 55 in a working area of the CPU 40 and the memories 60 to 67 related to the number of steps. It is assumed that the display part 10 simultaneously displays the clock 32 and the number of steps, and displays the current memory 51 in the state where the memories are cleared.

Then, the CPU 40 starts step-by-step motion of the clock 32 (ST2). Setting of correct time is described later. ST3 and subsequent steps form a step counting routine. At ST3, the CPU 40 determines whether or not a walking input is received from the walking detection sensor 30, and the process advances to ST6 if the determination is of NO. If the determination is of YES, the CPU 40 adds 1 to the numerical value of the present count memory 51 (ST4), while adding 1 also to the numerical value of the current memory 52 (ST5).

At ST6, the CPU 40 determines whether or not an operation input is received from the operation part 31. If the determination is of YES, the process advances to ST10 for operation input processing, as described later. If the determination is of NO, the CPU 40 performs step-by-step processing of the clock 32 (ST7). According to the block structure of the pedometer shown in FIG. 3, the clock 32 is located outside the CPU 40 and hence the CPU 40 reads the time of the clock 32 and displays the read time on the display part 10. The time may alternatively be stepped by timer processing of the CPU 40 itself, as a matter of course. At ST8, the CPU 40 determines whether or not the time has reached the set time, 24:00 in this case. If the determination is of YES, the process advances to ST20 for date change processing, as described later. If the determination is of NO, the process returns to ST3 for repeating the series of processing through ST3 to ST8.

The operation input processing (ST10) is now described with reference to the flow chart of FIG. 8. When determining that the operation input is received at ST6, the CPU 40 determines whether or not the operation input is a reset input (ST11), and the process advances to ST13 if the determination is of NO. If the determination is of YES, the CPU 40 clears the present count memory 51 (ST12). As described above, the present count memory 51, independent of the current memory 52, records the number of steps between sections or the like.

At ST13, the CPU 40 determines whether or not the operation input is a display switch input, and the process advances to ST15 if the determination is of NO. If the determination is of YES, the CPU 40 switches the display of the number of steps (ST14). In this case, the display is simply sequentially switched as the present count → the current number of steps → the number of steps counted on the preceding day → the number of steps counted two days before → . . . → the number of steps counted seven days before → the total number of steps counted over seven days → the number of days → the total number of steps → the average number of steps → the present count (again) . . . . Alternatively, the memories may be classified into a group of weeklong memories and a group of memories related the total number of steps, for switching the display every group.

Figure 7:
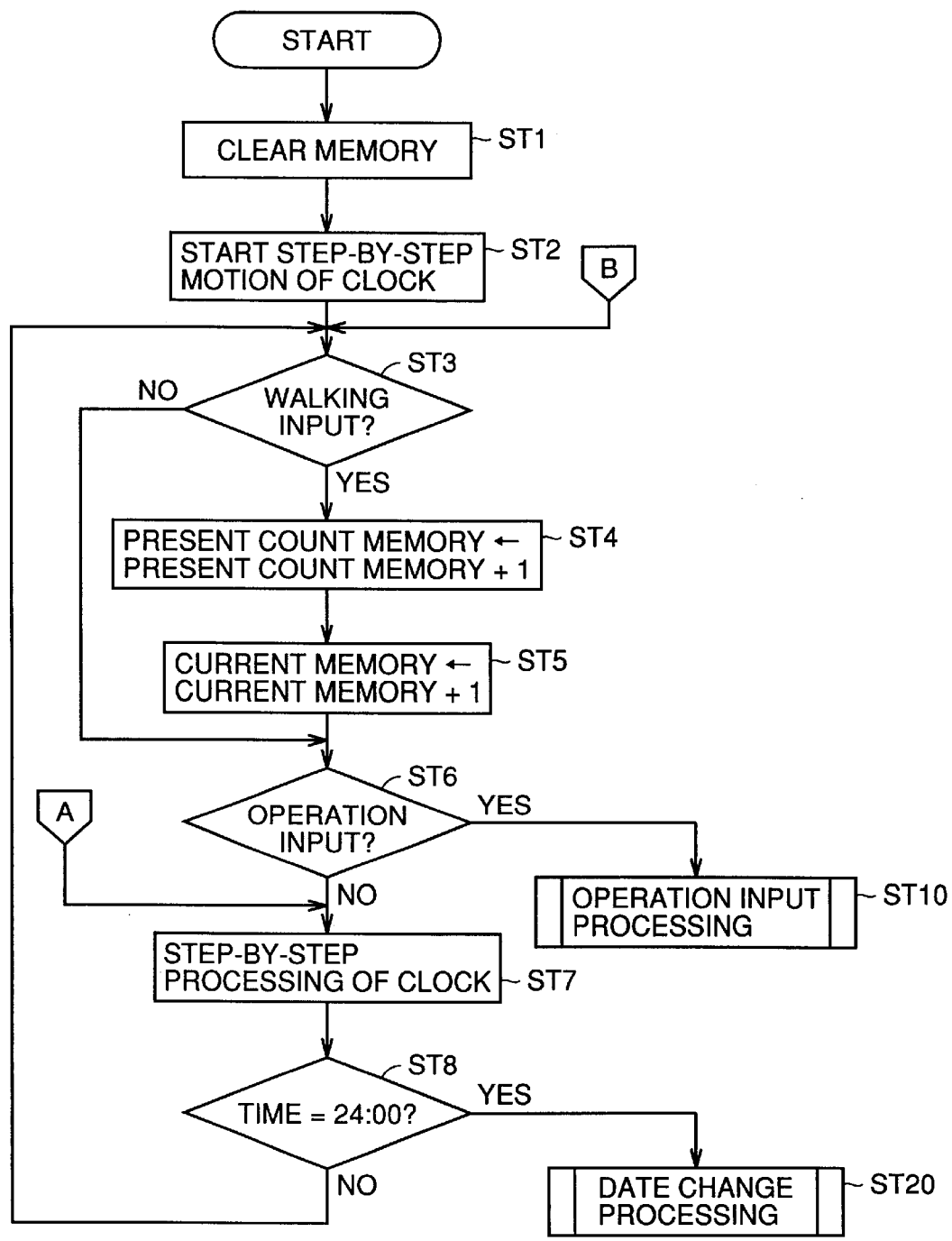
FIG. 7 is a flow chart for illustrating overall operation of the pedometer.
Figure 8:
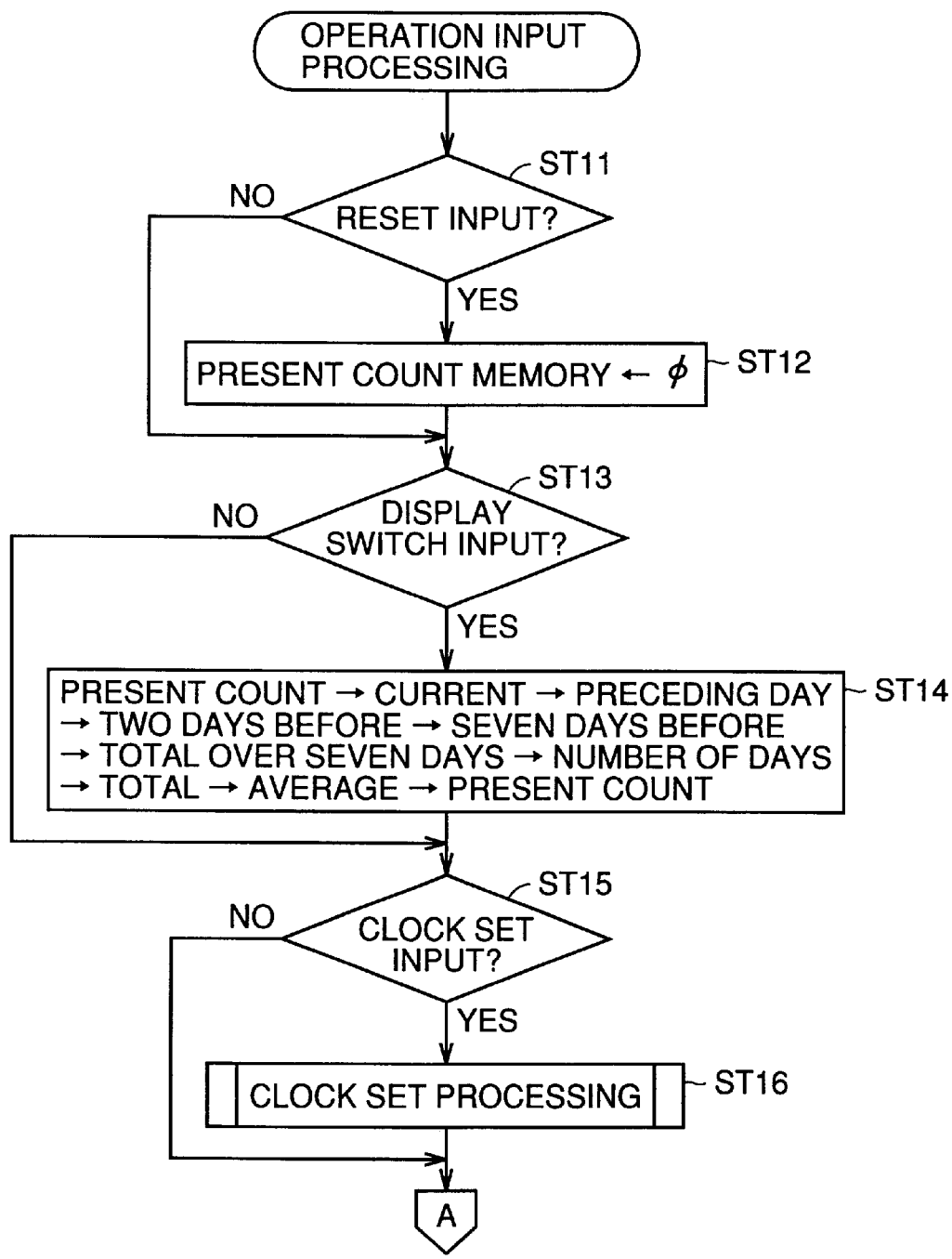
FIG. 8 is a flow chart for illustrating operation input processing in the flow chart shown in FIG. 7.

At ST15, the CPU 40 determines whether or not the operation input is a clock set input, so that the operation input processing is terminated and the process advances to ST7 of the flow chart shown in FIG. 7 if the determination is of NO. If the determination is of YES, the CPU 40 performs clock set processing (ST16). In this time set processing, the CPU 40 sets or corrects the time of the clock 32 with a known technique, details of which are not described. While the display part 10 simultaneously displays the clock 32 and the number of steps in this flow chart, the clock 32 and the number of steps may alternatively be switchingly displayed. In this case, the display is switched to the clock 32 when the time set input is received.

The date change processing (ST20) is now described with reference to the flow chart of FIG. 9. When the time is 24:00 at ST8 (when a day has elapsed), the CPU 40 first performs processing related to the memories for seven days regardless of whether or not the user wears the pedometer (ST21). In other words, the CPU 40 sequentially shifts the contents of the current memory 52 to the step memory 61 for the preceding day, the contents of the step memory 61 for the preceding day to the step memory 62 for two days before, . . . , the contents of the step memory 66 for six days before to the step memory 67 for seven days before. Thus, the numerical value of the step memory 67 for seven days before is deleted. If the pedometer has a function of storing not weeklong data but monthlong data, the CPU 40 shifts the contents of such memories in response to the monthlong, as a matter of course. At ST22, the CPU 40 adds up the values of the step memories 61 to 67 for the preceding day to seven days before for calculating the total number of steps counted over seven days, and stores the obtained value in the total memory 60 over seven days.

At ST23, the CPU 40 determines whether or not the value of the current memory 52 is greater than a predetermined value N of 100, for example. If the determination is of NO, the CPU 40 erases the contents of the current memory 52 (ST27) without through ST24 to ST26, and the process returns to ST3 of the flow chart shown in FIG. 7. If the current number of steps is not more than 100, the CPU 40 determines that the user has forgotten wearing the pedometer, not to add the number of steps ($\leq 100$) to the data of the average number of steps etc.

When the value of the current memory 52 is greater than the set value at ST23, the CPU 40 adds the contents of the current memory 52 to the data of the total step memory 54 (ST24), steps the contents of the day memory 53 by one day (ST25) and divides the contents of the total step memory 54 by the contents of the day memory 53 for calculating the average number of steps per day and storing the obtained value in the average step memory 55 (ST26). The CPU 40 clears the contents of the current memory 52 (ST27), and the process returns to ST3.

While the CPU 40 determines whether or not the user wears the pedometer by determining whether or not the value of the current memory 52 is greater than the set value in the aforementioned embodiment, this determination may alternatively be made by switch operation. For example, a mechanical switch is provided to interlock with the clip 20. When the clip 20 holds slacks or a belt, the switch is turned on so that the CPU 40 determines that the user currently wears the pedometer. If the mechanical switch remains off, the CPU 40 determines that the user does not wear the pedometer.

Figure 9:
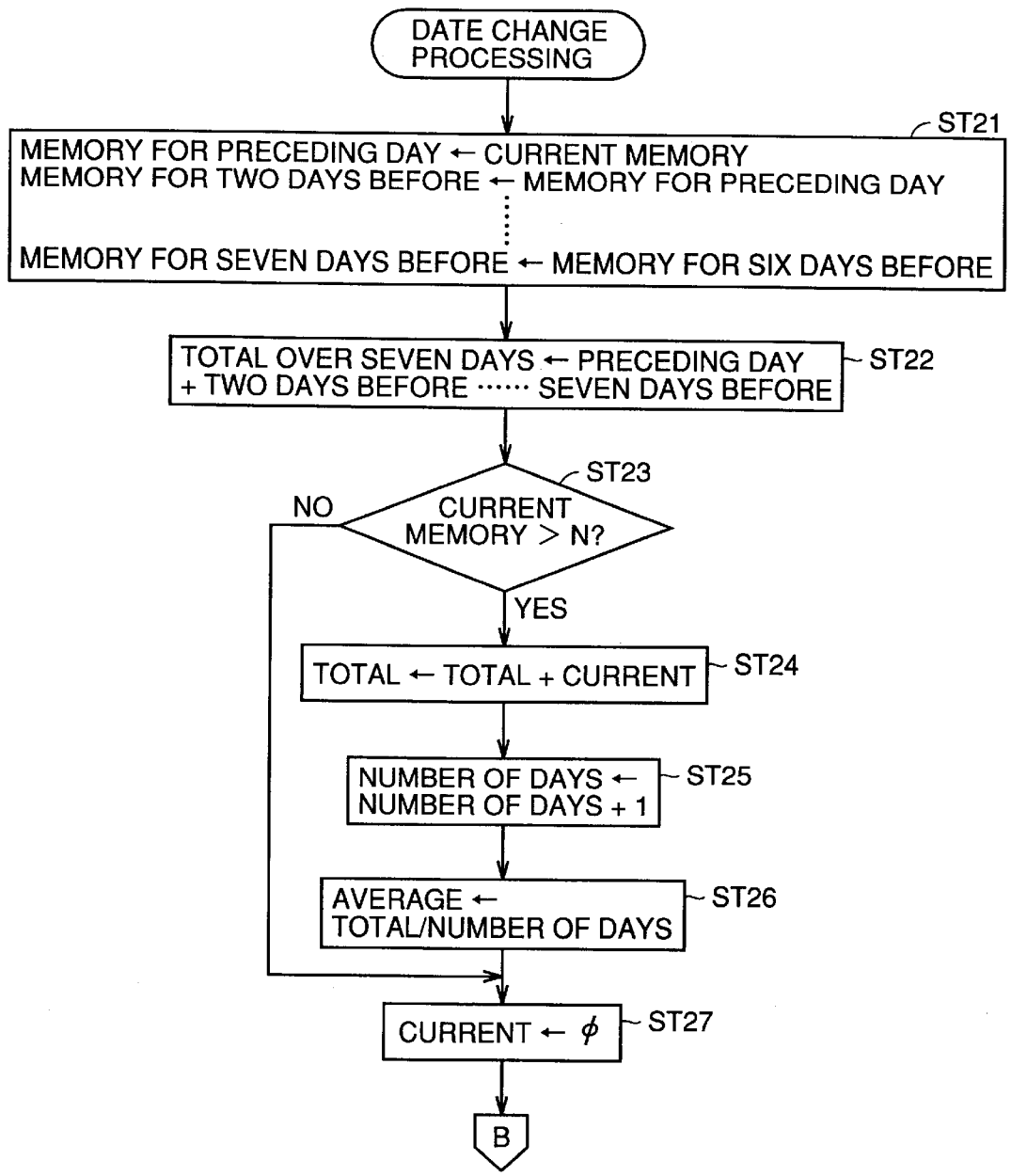
FIG. 9 is a flow chart for illustrating date change processing in the flow chart shown in FIG. 7.

In the flow chart shown in FIG. 9, the CPU 40 does not employ the contents of the current memory 52 for calculating the average number of steps when determining that the user does not wear the pedometer. Also when the CPU 40 determines that the user does not wear the pedometer, however, the processing of ST24 and ST25 may be automatically or manually forcibly carried out as described above. In this case, the CPU 40 determines whether or not to make a manual input if the determination at ST23 is of NO, for example, so that the user adds a roughly estimated value of the current number of steps to the data of the total step memory 54 while adding 1 to the contents of the day memory 53. Alternatively, the pedometer itself automatically adds the current average number of steps to the data of the total step memory 54 and steps the contents of the day memory 53 by one day. Thus, the total number of steps and the total number of days can be continuously calculated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pedometer having a walking detection sensor for detecting walking, including:
   a counter counting outputs from said walking detection sensor;
   a clock measuring time;
   a memory storing the total of each of the number of steps theretofore counted by said counter and the number of days spent for counting said steps on the basis of the time measured by said clock;
   a wear determination part determining whether or not the user wears said pedometer;
   a display part displaying information related to said walking; and
   a control part calculating an average number of steps per day from the total number of steps and the total number of days stored in said memory, displaying said average number of steps on said display part and controlling said display part and said memory to add the current number of steps and the number of days to the total number of steps and the total number of days stored in said memory respectively on a day said wear determination part determines that the user wears said pedometer and not to add the current number of steps and the number of days to the total number of steps and the total number of days stored in said memory respectively on a day said wear determination part determines that the user does not wear said pedometer.

2. The pedometer according to claim 1, wherein said wear determination part determines whether or not the user wears said pedometer with the current total number of steps.

3. The pedometer according to claim 2, wherein said wear determination part compares the current total number of steps with a predetermined set value and determines that the user does not wear said pedometer when the total number of steps is not more than said set value.

4. The pedometer according to claim 3, wherein said set value is changeable.

5. The pedometer according to claim 1, wherein said pedometer has a key or a switch, and said wear determination part determines whether or not the user wears said pedometer through operation of said key or said switch.

6. The pedometer according to claim 1, further having a function of manually adding the current number of steps or a preceding average number of steps and the number of days to the total number of steps and the total number of days stored in said memory respectively on a day said wear determination part determines that the user does not wear said pedometer.

7. The pedometer according to claim 1, wherein said memory stores the number of steps counted over a plurality of days every day, said display part switchingly displays the number of steps counted over said plurality of days every day, and said control part does not use the function of said wear determination part for determining whether or not the user wears said pedometer as to the storage of the number of steps counted over said plurality of days in said memory.

8. A pedometer having a walking detection sensor for detecting walking, comprising:
   a counter counting outputs from said walking detection sensor;
   a clock measuring time;
   a memory storing the total of each of the number of steps theretofore counted by said counter and the number of days spent for counting said steps on the basis of the time measured by said clock;
   a wear determination part determining whether or not the user wears said pedometer; and
   a display part displaying information related to said walking,
   for calculating an average number of steps per day from the total number of steps and the total number of days stored in said memory, displaying said average number of steps on said display part, adding the current number of steps and the number of days to the total number of steps and the total number of days stored in said memory respectively on a day said wear determination part determines that the user wears said pedometer and adding the current average number of steps and the number of days to the total number of steps and the total number of days stored in said memory respectively on a day said wear determination part determines that the user does not wear said pedometer.

9. A pedometer having a walking detection sensor for detecting walking, comprising:
   a counter counting outputs from said walking detection sensor;
   a clock measuring time;
   a memory storing the total of each of the number of steps theretofore counted by said counter and the number of days spent for counting said steps on the basis of the time measured by said clock;
   a wear determination part determining whether or not the user wears said pedometer; and
   a display part displaying information related to said walking, for calculating an average number of steps per day from the total number of steps and the total number of days stored in said memory, displaying said average number of steps on said display part, adding the current number of steps and the number of days to the total number of steps and the total number of days stored in said memory respectively on a day said wear determination part determines that the user wears said pedometer and adding the current number of steps or a preceding average number of steps and the number of days to the total number of steps and the total number of days stored in said memory respectively on a day said wear determination part determines that the user does not wear said pedometer.

* * * * *